(12) United States Patent
Zheng

(10) Patent No.: US 9,709,213 B2
(45) Date of Patent: Jul. 18, 2017

(54) HOLDER FOR SMART DEVICE

(71) Applicant: Patent Category Corp., Walnut, CA (US)

(72) Inventor: Yu Zheng, Walnut, CA (US)

(73) Assignee: Patent Category Corp., Walnut, CA (US)

( * ) Notice: Subject to any disclaimer, the term of this patent is extended or adjusted under 35 U.S.C. 154(b) by 0 days.

(21) Appl. No.: 14/921,870

(22) Filed: Oct. 23, 2015

(65) Prior Publication Data

US 2017/0114948 A1    Apr. 27, 2017

(51) Int. Cl.
*G06F 1/16* (2006.01)
*F16M 11/04* (2006.01)
*F16M 11/40* (2006.01)

(52) U.S. Cl.
CPC ............ *F16M 11/40* (2013.01); *F16M 11/04* (2013.01); *G06F 1/1613* (2013.01)

(58) Field of Classification Search
None
See application file for complete search history.

(56) References Cited

U.S. PATENT DOCUMENTS

| 3,532,225 | A | * | 10/1970 | Reed | A47B 13/02 211/181.1 |
|---|---|---|---|---|---|
| 5,457,745 | A | * | 10/1995 | Wang | B60R 11/0241 379/426 |
| D395,545 | S | * | 6/1998 | Crim, Jr. | D3/218 |
| 6,209,973 | B1 | * | 4/2001 | Steinberg | G06F 1/1601 312/204 |
| 8,240,628 | B2 | * | 8/2012 | Huang | F16M 11/041 248/122.1 |
| D682,283 | S | * | 5/2013 | Tak | D14/447 |
| D687,428 | S | * | 8/2013 | Kim | D14/253 |
| D732,043 | S | * | 6/2015 | Elliott | D14/440 |
| 9,062,812 | B2 | * | 6/2015 | Tsai | F16M 13/00 |
| 2007/0069102 | A1 | * | 3/2007 | Kane | A47B 23/042 248/444 |
| 2011/0114805 | A1 | * | 5/2011 | Ye | F16M 11/046 248/122.1 |
| 2011/0139945 | A1 | * | 6/2011 | Fahrberger | H04M 1/04 248/121 |
| 2012/0025035 | A1 | * | 2/2012 | Huang | F16M 11/041 248/122.1 |
| 2012/0309256 | A1 | * | 12/2012 | Theodore | F16M 11/041 446/72 |

(Continued)

*Primary Examiner* — Xanthia C Cunningham
(74) *Attorney, Agent, or Firm* — Raymond Sun

(57) ABSTRACT

A holder for a smart device has a skeleton made from a bendable metal wire, the skeleton including at least one upper leg extending upwardly, two arms extending outwardly, and two lower legs extending in a forward direction that is generally perpendicular to the orientation of the at least one upper leg and the two arms. Each upper leg has an extremity that is bent to form a hook-shaped retention section, each arm has a hand that is also bent to form retention sections, and each of the lower legs has feet that are bent to form retention sections. The lower edge of the smart device rests adjacent the retention sections formed by the feet, the upper edge of the smart device rests adjacent the retention sections defined by the extremities of the upper legs, and the side edges of the smart device rest adjacent the retention sections defined by the hands.

10 Claims, 4 Drawing Sheets

(56) References Cited

U.S. PATENT DOCUMENTS

| | | | |
|---|---|---|---|
| 2013/0137337 A1* | 5/2013 | Park | A63H 3/003 446/73 |
| 2013/0148270 A1* | 6/2013 | Fujioka | F16M 13/00 361/679.01 |
| 2014/0263931 A1* | 9/2014 | Chen | F16M 11/041 248/576 |
| 2015/0292672 A1* | 10/2015 | Dose | F16M 13/022 361/679.56 |
| 2015/0358044 A1* | 12/2015 | Barstead | H04B 1/3888 455/575.1 |
| 2016/0236111 A1* | 8/2016 | Lowry | F16M 11/40 |

* cited by examiner

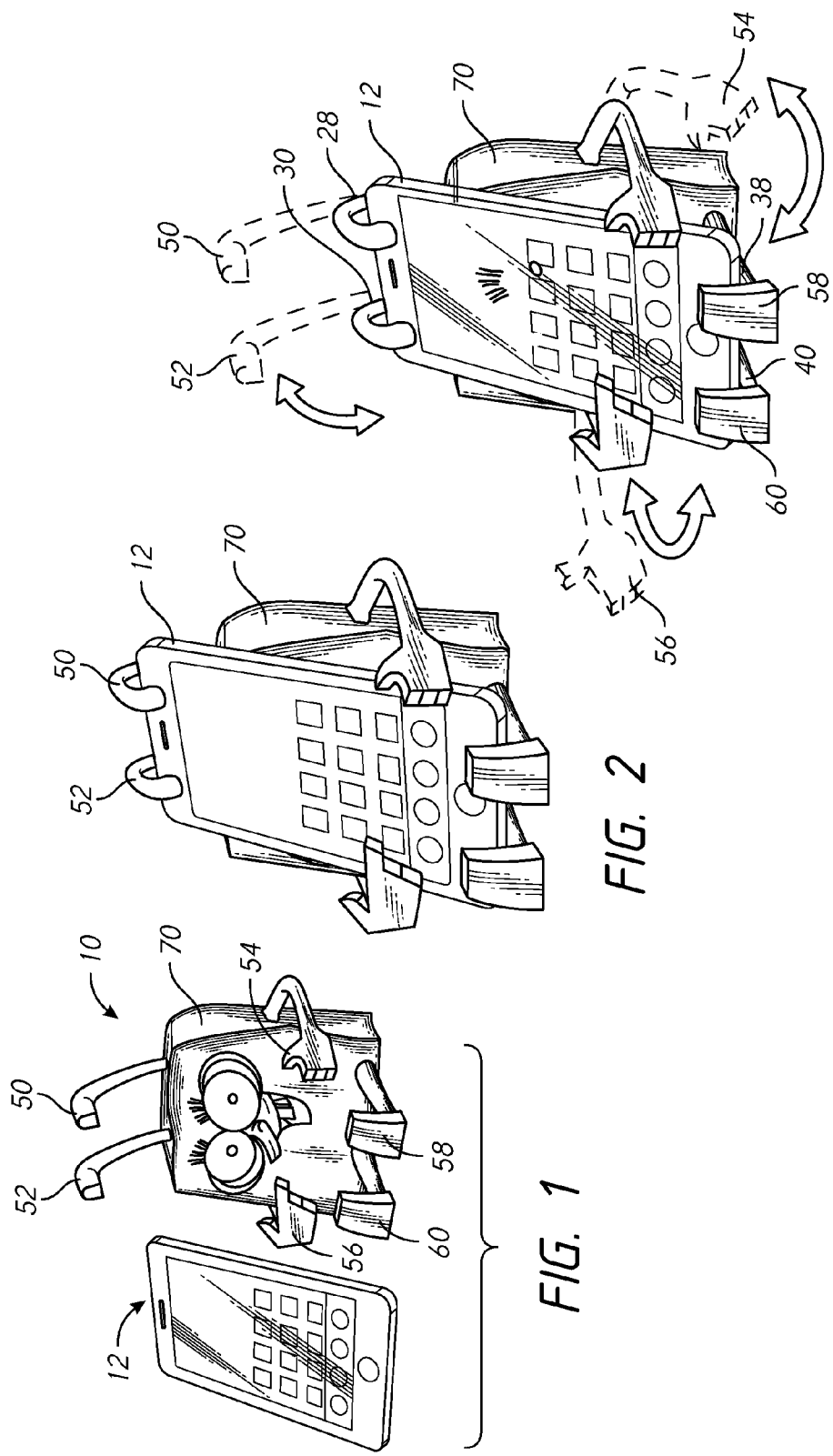

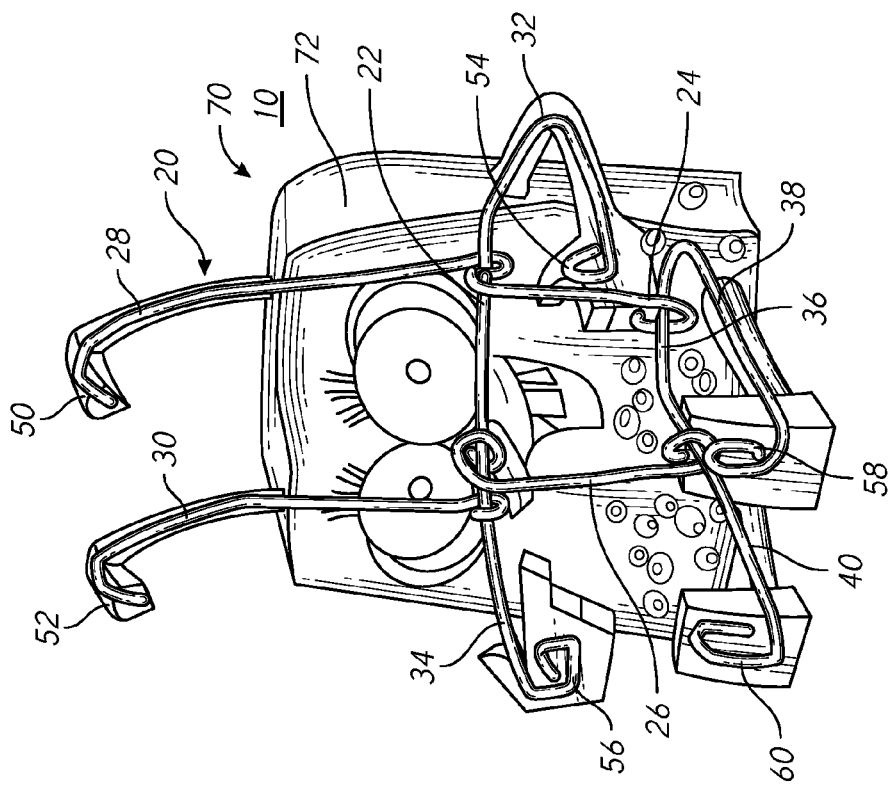
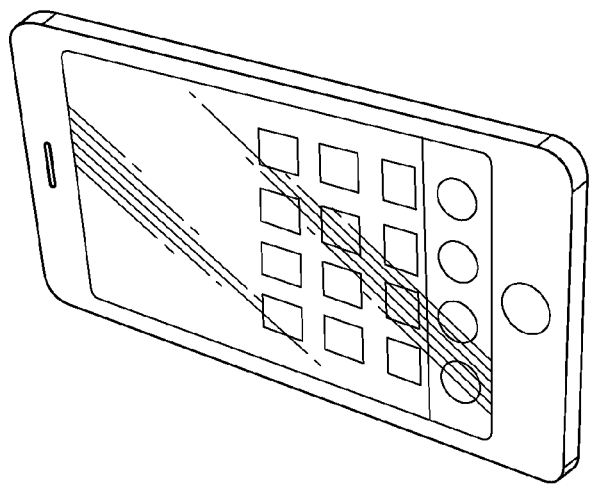
FIG. 4

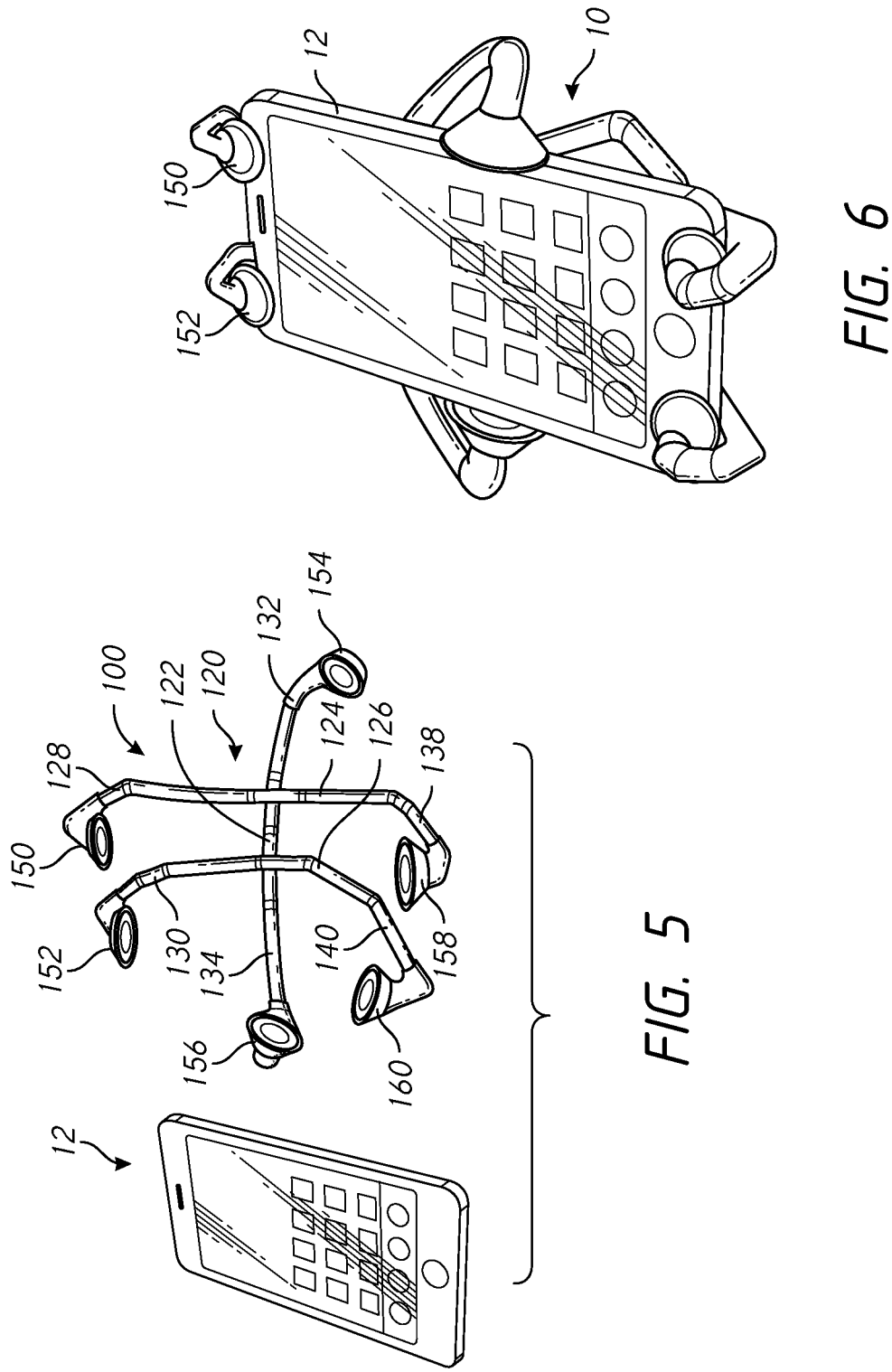

HOLDER FOR SMART DEVICE

BACKGROUND OF THE INVENTION

1. Field of the Invention

The present invention relates to a holder for a smart device, such as a smart phone or smart pad.

2. Description of the Prior Art

Smart devices like smart pads and smart phones have been commonplace in today's society. Almost everyone has at least one of the devices, and uses them to do many daily activities, such as reading and writing emails, texting, surfing the Internet, shopping, reading books, watching videos, and others. The smart device is often in the user's hand for such long periods of time that carpal tunnel syndrome, fatigue and other physical and health issues arise with over-use of the smart device.

Thus, there remains a need for accessories and devices that can aid a smart device user in the use of the smart device. More specifically, there remains a need for a holder which allows a user to rest his or her hands and arms while using a smart device.

SUMMARY OF THE DISCLOSURE

In order to accomplish the objects of the present invention, there is provided a holder for a smart device. The holder has a skeleton made from a bendable metal wire, the skeleton including at least one upper leg extending upwardly, two arms extending outwardly, and two lower legs extending in a forward direction that is generally perpendicular to the orientation of the at least one upper leg and the two arms. Each upper leg has an extremity that is bent to form a hook-shaped retention section, each arm has a hand that is also bent to form retention sections, and each of the lower legs has feet that are bent to form retention sections. The lower edge of the smart device rests adjacent the retention sections formed by the feet, the upper edge of the smart device rests adjacent the retention sections defined by the extremities of the upper legs, and the side edges of the smart device rest adjacent the retention sections defined by the hands.

In one embodiment of the present invention, the holder can include a cover that entirely encloses a central horizontal support and a vertical support for the skeleton, and encloses portions of the upper legs, the two arms and the two lower legs.

BRIEF DESCRIPTION OF THE DRAWINGS

FIG. 1 is an exploded perspective view of a smart device and a holder according to one embodiment of the present invention.

FIG. 2 is a perspective view of the smart device being retained on the holder of FIG. 1 in a secured position.

FIG. 3 is a perspective view of the smart device being retained on the holder of FIG. 1 in an unsecured position.

FIG. 4 illustrates the internal components of the holder of FIG. 1.

FIG. 5 is an exploded perspective view of a smart device and a holder according to another embodiment of the present invention.

FIG. 6 is a perspective view of the smart device being retained on the holder of FIG. 5 in a secured position.

DETAILED DESCRIPTION OF THE PREFERRED EMBODIMENTS

Figure 7:
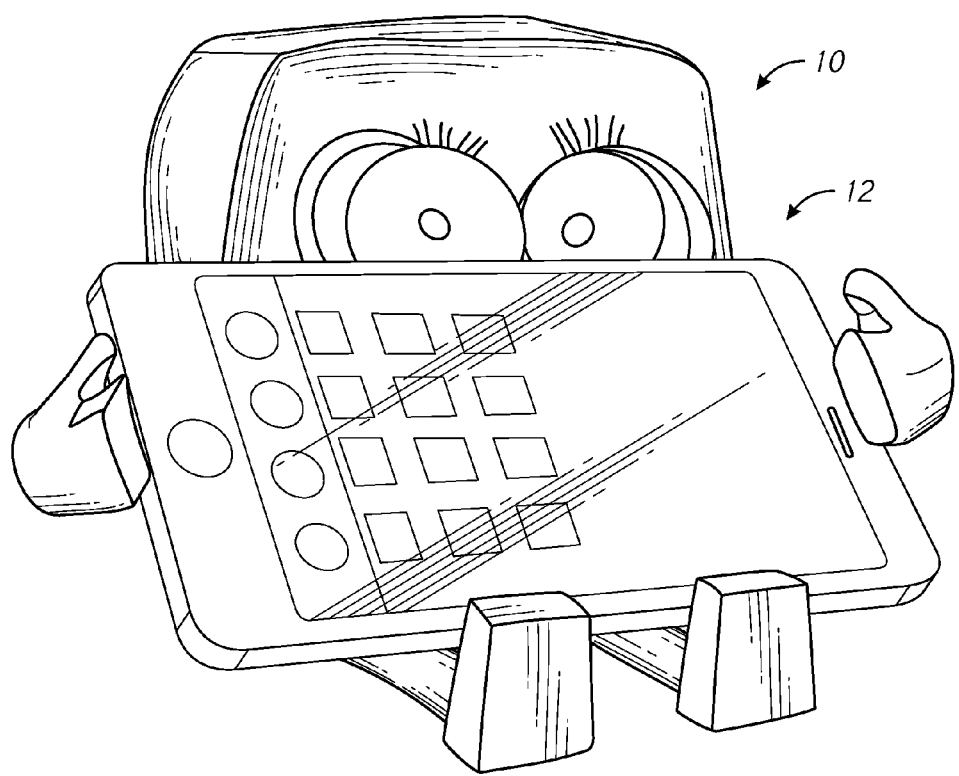
FIG. 7 illustrates the smart device and holder of FIG. 2 with the smart device being retained in a different orientation.

The following detailed description is of the best presently contemplated modes of carrying out the invention. This description is not to be taken in a limiting sense, but is made merely for the purpose of illustrating general principles of embodiments of the invention. The scope of the invention is best defined by the appended claims. In certain instances, detailed descriptions of well-known devices and mechanisms are omitted so as to not obscure the description of the present invention with unnecessary detail.

FIGS. 1 and 4 illustrate one embodiment of a holder 10 that can be used with a smart device 12. The smart device 12 can be any conventional smart device, such as a smart phone, smart pad (e.g., APPLE™ iPAD™) or similar device that is generally four-sided and relatively thin in profile.

The holder 10 has a skeleton 20 that can be made of a bendable wire that can be made of any bendable metal. The wire can have a central horizontal support 22, and two spaced-apart vertical supports 24 and 26 extending downwardly from the horizontal support 22. Two upper legs 28 and 30 extend upwardly in spaced-apart and parallel fashion from the horizontal support 22, and two arms 32 and 34 extend outwardly from the horizontal support 22. A bottom wire loops around in a U-shaped configuration around the bottom of the vertical supports 24 and 26, with the bottom wire defining a rear section 36 that transitions into two legs 38 and 40 that extend outwardly at ninety degrees away from the general orientation of the vertical supports 24 and 26.

The extremities 50 and 52 of the legs 28 and 30, respectively, can be bent to form a hook-shaped retention section. Similarly, the hands 54 and 56 of the arms 32 and 34, respectively, are also bent to form separate retention sections. Finally, the feet 58 and 60 of the legs 38 and 40, respectively, are bent to form yet another retention section. These three separate retention sections function to hold a smart device 12 against the backbone of the holder 10, as shown in FIG. 2, with the backbone defined by the legs 28, 30, the horizontal support 22, and the vertical supports 24 and 26.

A cover 70 can be provided to cover most of the skeleton 20 except for portions of the legs 28 and 30 and their extremities 50, 52, the arms 32 and 34 and their hands 54 and 56, and the legs 38 and 40 and their feet 58 and 60. The cover 70 can have a padded filling 72 inside to provide bulk and volume, and the filling 72 can be any conventional filling that is used for stuffed toys. In addition, a weighted item (e.g., beads 90) can be filled inside the cover 70 to provide necessary weight to support a heavier smart device (e.g., a smart pad). Images and decorations can be provided on the outside of the cover 70 so that the cover 70 can be made to resemble any desired object or character. Also, the cover 70 can also be provided in any desired size or shape to resemble any object or character.

As shown in FIGS. 2, 3 and 7, the holder 10 can be used to hold a smart device 12. The smart device 12 can be placed with the lower edge along on the legs 38 and 40, and the upper opposite edge against the upper legs 28 and 30, as shown in FIG. 3. The extremities 50, 52, the hands 54, 56 and the feet 58, 60 can be bent inwardly to hold the smart device 12 securely against the cover 70 and the underlying skeleton 20, as shown in FIG. 2. The smart device 12 can be removed by unbending the extremities 50, 52, the hands 54, 56 and the feet 58, 60.

FIG. 5 illustrates another holder 100 that includes a skeleton 120 but without a cover. The skeleton 120 can also be made of a bendable wire that can be made of any bendable metal. The wire can also have a central horizontal support 122, and two spaced-apart vertical supports 124 and 126 extending downwardly from the horizontal support 122. Two upper legs 128 and 130 extend upwardly in spaced-apart and parallel fashion from the horizontal support 122, and two arms 132 and 134 extend outwardly from the horizontal support 122. Two legs 138 and 140 that extend from the vertical supports 124 and 126, respectively.

The extremities 150 and 152 of the legs 128 and 130, respectively, can be bent to form a hook-shaped retention section. Similarly, the hands 154 and 156 of the arms 132 and 134, respectively, are also bent to form another retention section. Finally, the feet 158 and 160 of the legs 138 and 140, respectively, are bent to form yet another retention section. These three separate retention sections function to hold a smart device 12 against the backbone of the holder 100, as shown in FIG. 6, with the backbone defined by the legs 128, 130, the horizontal support 122, and the vertical supports 124 and 126.

As shown in FIG. 6, the holder 100 can be used to hold a smart device 12. The smart device 12 can be placed with the lower edge along on the legs 138 and 140, and the upper opposite edge against the upper legs 128 and 130. The extremities 150, 152, the hands 154, 156 and the feet 158, 160 can be configured to be the shape of a circular disc or other enlarged shape (when compared with the diameter of the wire), and can be bent inwardly to hold the smart device 12 securely against the underlying skeleton 120. The smart device 12 can be removed by unbending the extremities 150, 152, the hands 154, 156 and the feet 158, 160.

The above detailed description is for the best presently contemplated modes of carrying out the invention. This description is not to be taken in a limiting sense, but is made merely for the purpose of illustrating general principles of embodiments of the invention. The scope of the invention is best defined by the appended claims. In certain instances, detailed descriptions of well-known devices, components, mechanisms and methods are omitted so as to not obscure the description of the present invention with unnecessary detail.

What is claimed is:

1. An assembly, comprising:
   a smart device having a lower edge, an upper edge and two side edges; and
   a holder having a skeleton made from a bendable metal wire, the skeleton including at least one upper leg extending upwardly, two arms extending outwardly, and two lower legs extending in a forward direction that is generally perpendicular to the orientation of the at least one upper leg and the two arms, wherein each of the at least one upper legs has an extremity that is bent to form a hook-shaped retention section, each arm has a hand that is also bent to form retention sections, and each of the lower legs has a foot that is bent to form retention sections;
   wherein the lower edge of the smart device rests adjacent the retention sections formed by the feet, the upper edge of the smart device rests adjacent the retention sections defined by the extremities of the at least one upper leg, and the side edges of the smart device rest adjacent the retention sections defined by the hands; and
   wherein the skeleton further includes a central horizontal support, and two spaced-apart vertical supports extending downwardly from the central horizontal support, with the at least one leg extending upwardly from the central horizontal support and the arms extending from the central horizontal support.

2. The assembly of claim 1, wherein the at least one leg comprises a pair of legs extending upwardly in spaced-apart and parallel fashion from the central horizontal support.

3. The assembly of claim 1, further including a cover that encloses portions of the at least one upper leg, two arms and the two lower legs.

4. The assembly of claim 3, wherein the cover encloses a weight.

5. An assembly, comprising:
   a smart device having a lower edge, an upper edge and two side edges; and
   a holder having:
      a skeleton made from a bendable metal wire, the skeleton including a central horizontal support, and two spaced-apart vertical supports extending downwardly from the central horizontal support, the skeleton further including a pair of upper legs extending upwardly in spaced-apart and parallel fashion from the central horizontal support, two arms extending outwardly from the central horizontal support, and two lower legs extending from the vertical supports in a forward direction that is generally perpendicular to the orientation of the vertical supports, wherein each of the at least one upper legs has an extremity that is bent to form a hook-shaped retention section, each arm has a hand that is also bent to form retention sections, and each of the lower legs has a foot that is bent to form retention sections; and
      a cover that entirely encloses the central horizontal support and the vertical support, and encloses portions of the upper legs, the two arms and the two lower legs;
   wherein the lower edge of the smart device rests adjacent the retention sections formed by the feet, the upper edge of the smart device rests adjacent the retention sections defined by the extremities of the at least one upper leg, and the side edges of the smart device rest adjacent the retention sections defined by the hands.

6. The assembly of claim 5, wherein the cover encloses a weight.

7. An assembly, comprising:
   a smart device having a lower edge, an upper edge and two side edges; and
   a holder having a skeleton made from a bendable metal wire, the skeleton including at least one upper leg extending upwardly, two arms extending outwardly, and two lower legs extending in a forward direction that is generally perpendicular to the orientation of the at least one upper leg and the two arms, wherein each of the at least one upper legs has an extremity that is bent to form a hook-shaped retention section, each arm has a hand that is also bent to form retention sections, and each of the lower legs has a foot that is bent to form retention sections;
   wherein the lower edge of the smart device rests adjacent the retention sections formed by the feet, the upper edge of the smart device rests adjacent the retention sections defined by the extremities of the at least one upper leg, and the side edges of the smart device rest adjacent the retention sections defined by the hands; and
   wherein the skeleton further includes a central horizontal support, and at least one vertical support extending downwardly from the central horizontal support, with the at least one leg extending upwardly from the central horizontal support and the arms extending from the central horizontal support.

8. The assembly of claim 7, wherein the at least one leg comprises a pair of legs extending upwardly in spaced-apart and parallel fashion from the central horizontal support.

9. The assembly of claim 7, further including a cover that encloses portions of the at least one upper leg, two arms and the two lower legs.

10. The assembly of claim 9, wherein the cover encloses a weight.

\* \* \* \* \*